(12) United States Patent
Ovsyannikov et al.

(10) Patent No.: US 8,589,452 B2
(45) Date of Patent: Nov. 19, 2013

(54) END USER DEFINED EVENT RULES FOR ERP APPLICATIONS

(75) Inventors: Alexey Ovsyannikov, Copenhagen (DK); Benjamin Brink Allsopp, Copenhagen (DK); Mehmet Kerem Kiziltunc, Frederiksburg C (DK); Brian Elgaard Bennett, Virum (DK)

(73) Assignee: Microsoft Corporation, Redmond, WA (US)

( * ) Notice: Subject to any disclaimer, the term of this patent is extended or adjusted under 35 U.S.C. 154(b) by 608 days.

(21) Appl. No.: 11/063,763

(22) Filed: Feb. 23, 2005

(65) Prior Publication Data
US 2006/0190473 A1 Aug. 24, 2006

(51) Int. Cl.
*G06F 17/30* (2006.01)

(52) U.S. Cl.
USPC .......................................... 707/805

(58) Field of Classification Search
USPC .......................................... 707/805
See application file for complete search history.

(56) References Cited

U.S. PATENT DOCUMENTS

| | | | |
|---|---|---|---|
| 6,381,594 B1 | 4/2002 | Eichstaedt et al. | |
| 7,082,439 B1 | 7/2006 | Hickman et al. | |
| 2001/0044840 A1 | 11/2001 | Carleton | |
| 2003/0126181 A1 | 7/2003 | Young | |
| 2004/0002958 A1* | 1/2004 | Seshadri et al. | 707/3 |
| 2004/0002972 A1 | 1/2004 | Pather et al. | |
| 2004/0139450 A1 | 7/2004 | Hope et al. | |
| 2004/0186860 A1* | 9/2004 | Lee et al. | 707/200 |
| 2007/0150520 A1 | 6/2007 | Bennett et al. | |

FOREIGN PATENT DOCUMENTS

| | | |
|---|---|---|
| WO | WO 03/005165 | 1/2003 |
| WO | WO 2005/008402 | 1/2005 |
| WO | WO 2005/033840 | 4/2005 |

OTHER PUBLICATIONS

International Search Report and Written Opinion from the International Searching Authority regarding Application No. PCT/US2006/046820 dated Aug. 13, 2007.
Office Action from the United States Patent and Trademark Office regarding U.S. Appl. No. 11/297,759 dated Apr. 28, 2009.
Office Action from the United States Patent and Trademark Office regarding U.S. Appl. No. 11/297,759 dated Sep. 4, 2009.
Office Action from the United States Patent and Trademark Office regarding U.S. Appl. No. 11/297,759 dated Dec. 22, 2009.
Office Action from the United States Patent and Trademark Office regarding U.S. Appl. No. 11/297,759 dated May 28, 2010.
Sams Publishing, "Sams Teach Yourself SQL in 10 Minutes: Lesson 12. Joining Tables", Sep. 1999, 7 pages.

* cited by examiner

*Primary Examiner* — Hosain Alam
*Assistant Examiner* — Johnese Johnson (57) ABSTRACT

A method of creating alerts in a database system is disclosed. The method may include allowing the selection of at least one field or record to be monitored, determining the data in a database that affects the value of the selected field or record, storing a trigger related to the data determined to affect the value of the selected field or record wherein the trigger communicates if the data is accessed and creating a notification of the communication of the trigger.

20 Claims, 10 Drawing Sheets

END USER DEFINED EVENT RULES FOR ERP APPLICATIONS

BACKGROUND

Enterprise resource planning systems help businesses keep track of events that could affect one or more supply chains. The purpose of the system is to ensure a smooth flow of goods or services from suppliers to purchasers such that final production is not delayed. One way to ensure that the supply chain is maintained is to set alerts when events occur. However, alerts are usually not flexible or as easy to use as users would like.

SUMMARY

A method of creating alerts in a database system is disclosed. The method may include allowing the selection of at least one field or record to be monitored; determining the data in a database that affects the value of the selected field or record, storing a trigger related to the data determined to affect the value of the selected field or record wherein the trigger communicates if the data is accessed; and creating a notification of the communication of the trigger.

The method may also include allowing the selection of the field from a form used to display the field or record, allowing a user to view the selected field or record in a form, where the form may be the form used to create the alert or a default form for the selected field or record, by selecting the notification of the communication of the trigger, allowing time to be used as a condition for triggering an alert, allowing access related information to be displayed by selecting the notification of the communication of the trigger, allowing a previously created alert rule to be used as a template to create a new alert rule. A computing system with a processor programmed to perform the method and a computer readable medium with computer executable instructions to perform the method is also disclosed.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
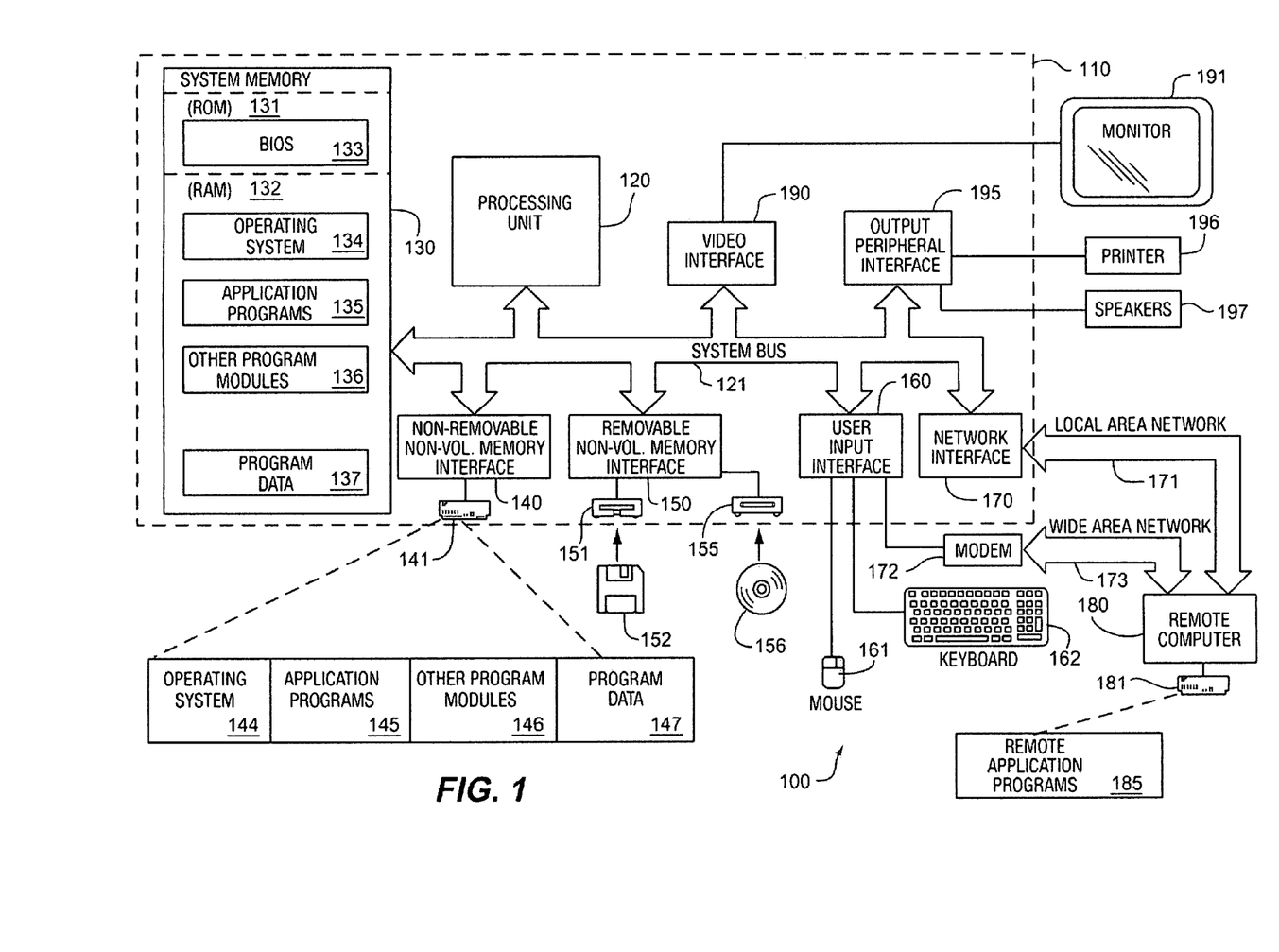
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
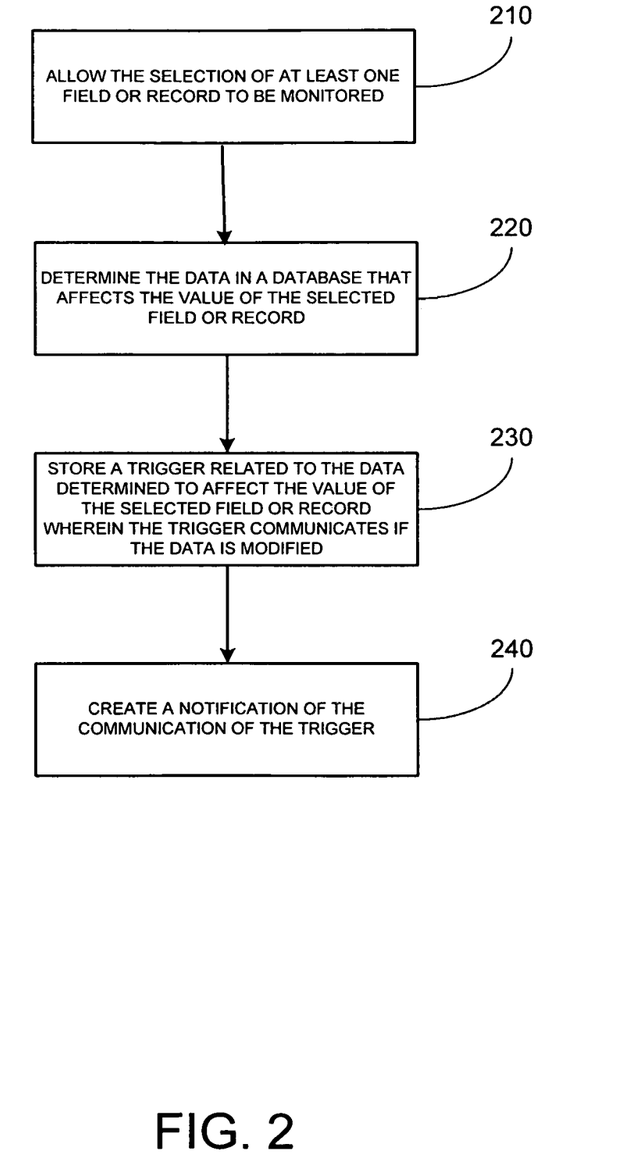
FIG. 2 is a flowchart of a method in accordance with the claims for creating alerts in a database system.

FIG. 2 may be a flowchart of a method in accordance with the claims for creating alerts in a database system. Initially, a list of fields or record in at least one form that may be monitored may be created. A form may be a business form such as a purchase order, a request for proposal, an invoice, etc. Each form may have fields or records such as a date field, a quantity field, a price field, an amount shipped field, etc. The fields or records may be used in several forms. Other fields or records may be only used in one or a few forms. For example, an invoice number field may be used on a few forms.

Figure 3:
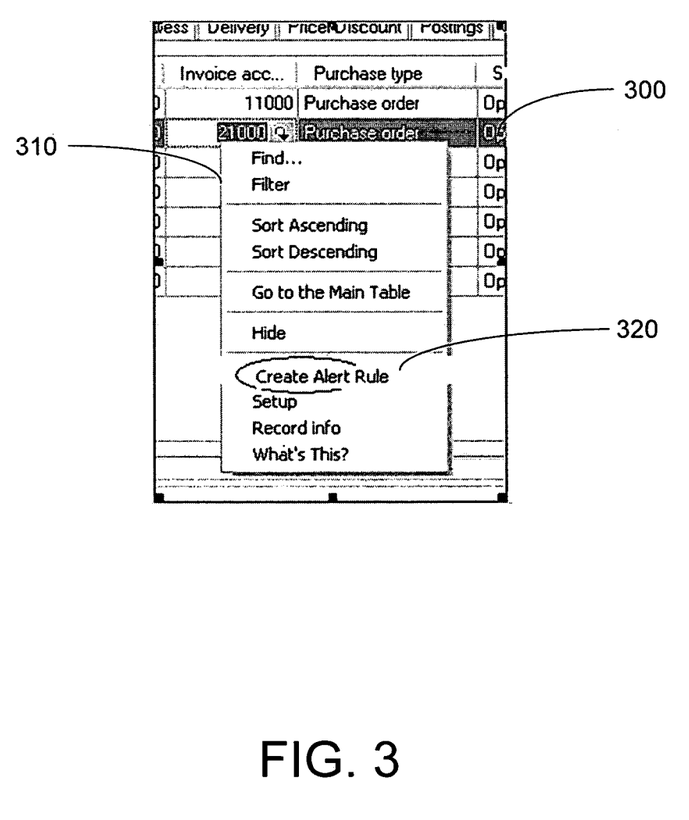
FIG. 3 is an illustration of a display of selecting a field or record to be used to be monitored using a monitoring rule.

At block 210, the selection of at least one field or record to be monitored from a form used to display the field or record may be permitted. For example, a user may select the "amount shipped" field. The selection may occur in a variety of ways. A user may right click on the field which may create a pop-up menu of options, including an option to select the field to be monitored. The user also may use a drop down menu to select one of a plurality of fields in a form to be monitored. FIG. 3 may illustrate a display of selecting a field to be monitored using a monitoring rule. In this example, the purchase order record 300 may be selected and various options may be presented in a pop-up window 310, including creating a rule alert 320. Other methods such as the input of codes or having the selection occur via another software module may be possible. Monitoring the field or record may undertake a variety of forms. The monitoring may entail watching whether a value changes, whether it increases, whether it decreases, whether it increases beyond a set amount, whether it has been accessed, etc.

Figure 4:
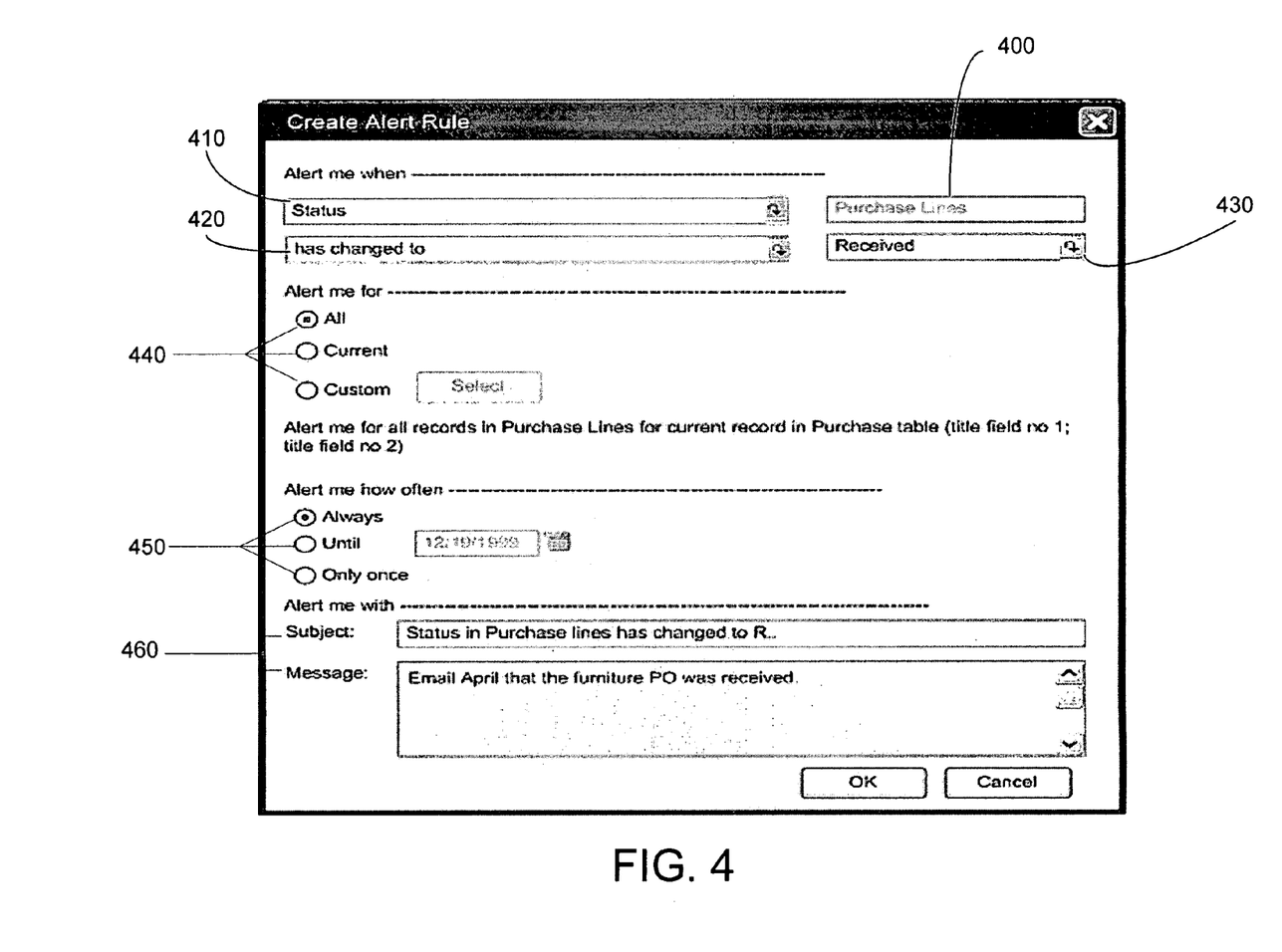
FIG. 4 is an illustration of a form used to create a monitoring rule.

FIG. 4 may be an illustration of a form used to create a monitoring rule. Assuming that a field has been selected the rule may allow conditions to be set for when an alert is created based on this field. These conditions can be thought of in layers. Event type (420) may be thought of as comparisons between the before value and the after value of a field such that an alert is only created when the value has changed, increased or decreased (brought forward or set back for dates). The comparison parameter (430) may be thought of as a further condition such that an alert is only created when the comparison of the before and after values crosses a boundary (e.g. the before value is less than 10 and the after value is greater than 10. Or the before value was before December 25 and the after value was after December 25). The filter (440) may be thought of as a further condition such that an alert is only created when the record in which the change happened and related records meet certain static criteria (e.g. the Country field must be equal to Germany). Alert receipt preferences (450) may be thought of as a further condition such that an alert will only be created as it is convenient for the recipient to receive it (E.g. only the first time all the other conditions are met, but not the second time). Beyond the conditions for when the alert will be created, FIG. 4 also illustrates details of how the alert may be delivered such as with an email with a certain subject and a certain message. The message may be automatically generated by the method, but a user may be permitted to modify the message. (460)

Figure 5:
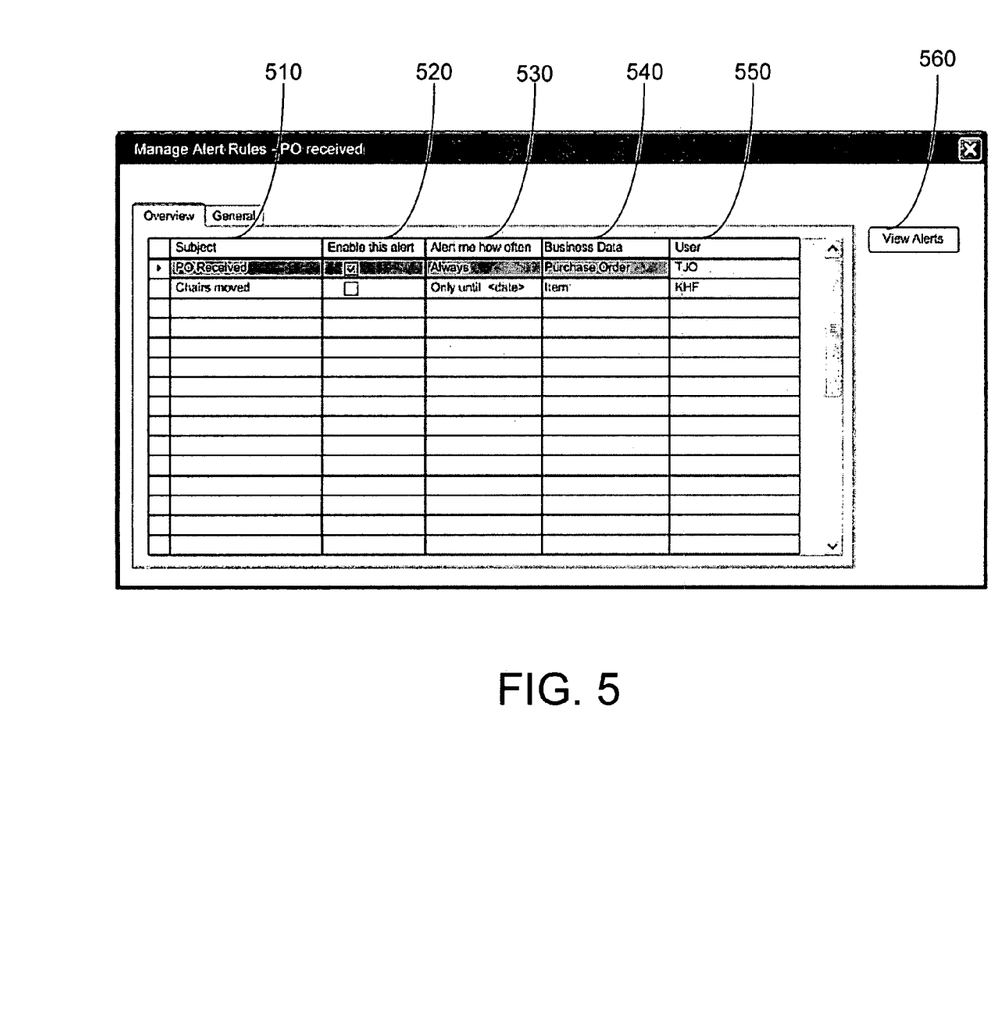
FIG. 5 is an illustration of a display of an option that all or some of the alert rules may be viewed or reviewed.

FIG. 5 may illustrate an option that all or some of the alert rules may be viewed or reviewed. The option may be available as part of the Tools menu. The created rules may be arranged by subject 510, whether the alert is enabled 520, often the alert is to be communicated 530, the business data to be monitored 540 and the user that should be alerted 550. There may also be an option to view all the alerts that have been triggered 560. Any of these displayed rules may be modified by selecting the relevant row and column related to the desired rule to be modified.

At block 220, the data in a database that affects the value of the selected field may be determined. The value in the selected field may be a calculated value based on a number of entries in a database, including the date. For example, a report an accounts receivable may pull data from a variety of database fields. Accordingly, block 220 may determine which entries affect the selected field.

For example, often in ERP applications there may be joins or combinations of fields that are used in forms to represent a number of records as one record to the user.

One "form record" may be the result of a join between n tables

Often the user does not know that he or she is viewing joined data from more than one table. The user may expect to be creating a rule for the master or result of the join even though the actual monitoring of changes to data in the database potentially is being done for several of the involved tables.

An example of a data set that may consist of joined data sources is the Sales Order Line: This data set may be a join between tables "SalesLine" and "InventDim". The user may see this data set as one record: A sales Order Line Another example may be the Item. The Item may form displays a data set which is the result of a join between five data sources divided over three tables: "InventTable", "InventTableModule" and "InventItemLocation" (One record from InventTable is joined to three different records in InventTableModule and furthermore the record is joined to a record in InventItemLocation). However, the user may see this data set as one record: An Item General Join Scenario The diagram above may illustrate how tables A, B, C and D may be joined together:

A1 joins to B1/B2 joins to C1/C2 joins to D1

The following rule setup scenarios explain how additional data-change monitoring (in the DatabaseLog table) may be applied when rules are setup for fields on each of the four tables:

Setting Up a Rule for a Field 'A56'

In this case no changes to data in tables B, C or D may affect what the user sees as changes in the field the rule applies to.
Conclusion:

Only data changes for field 'A56' may be monitored.
Setting Up a Rule for Field 'B34'

In this case a change to field 'A1' may potentially affects what the user will se in field 'B34' because the change in the join criteria 'A1' may cause a different record to be joined into the dataset.
Conclusion:

Monitoring of data changes may be setup for both 'A1' and 'B34'.

Setting Up a Rule for Field 'C12'

In this case a change to field 'A1' or a change to field 'B2' may potentially affect what the user will see in field 'C12'. In this scenario a different B-record may be joined into the data set if 'A1' is changed and a different C-record may be joined into the data set if 'B2' is changed.

Conclusion:

Monitoring of data changes may need to be setup for both 'A1', 'B2' and 'C12'.

Setting Up a Rule for Field 'D17'

In this case a change to field 'A1' or a change to field 'B2' or a change to field 'C2' may potentially affect what the user will see in field 'D17'. In this scenario, a different B-record may be joined into the data set if 'A1' is changed and a different C-record may be joined into the data set if 'B2' is changed and a different D-record may be joined into the data set if 'C2' is changed.

Conclusion:

Monitoring of data changes may need to be setup for both 'A1', 'B2', 'C2' and 'D17'.

Generalizing the Approach

Based on the scenarios above a general approach can defined as if a rule is setup for a table in the context of a joined data set in a form: then all the fields used as join criteria from parent to child for all upper data sources in the joined statement must be monitored.

Referring again to FIG. 2, at block 230, a trigger related to the data determined to affect the value of the selected field or record may be stored wherein the trigger communicates if the data is accessed. Data may be accessed to create the data, read the data, update the data or delete the data. The trigger may require the accessed data to be stored in a separate database table that is polled. The accessed data may also be immediately reported.

At block 240, a notification of the communication of the trigger field may be created. The notification may be created virtually immediately once access to data that affects the field or record has occurred or the notification may take place once the system has periodically polled for accessed data.

The method may also allow a user to view the selected field or record in a form by selecting the notification of the communication of the trigger. For example, if a notification of the total accounts receivable over 120 days old was created using an accounts receivable report, the report may be used to display the account receivable total over 120 days. The method may also have default forms associated with fields or records. For example, if the total accounts receivable field has been selected to be monitored, the method may display the changed total accounts receivable field in the default accounts receivable report. Once the notification of the communication of the trigger has been communicated, a variety of things may occur. The communication may simply be deleted. The communication may present an option to modify the monitoring. For example, if a dollar limit is set for monitoring the total accounts receivable, the dollar limit may be raised.

Figure 6:
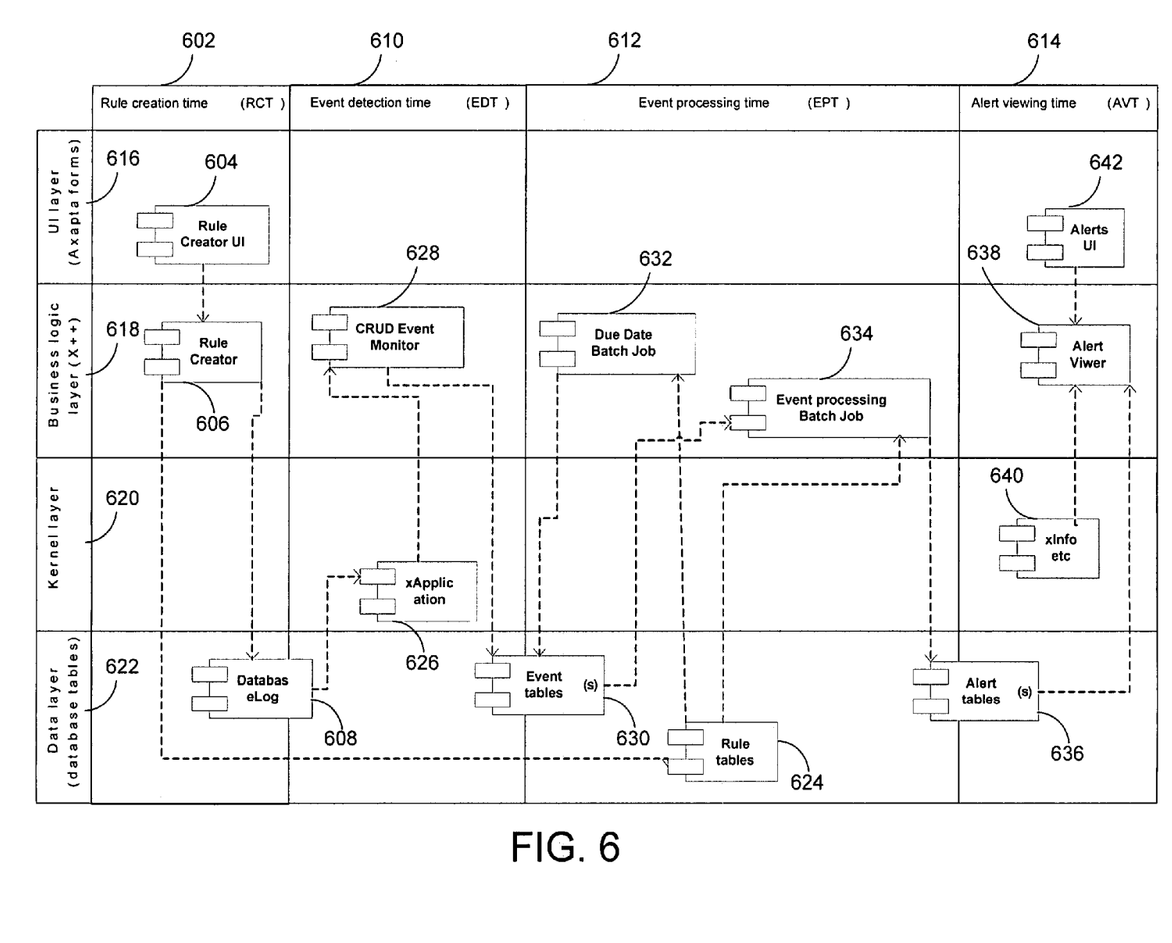
FIG. 6 is a block diagram of the flow of a system in accordance with the claims.

FIG. 6 may be a block diagram of the flow of a system in accordance with the claims. The overall architectural idea may be summarized that events will be generated based on database records being created, read, updated or deleted, and when a database date field is n days from today. For an update event, the previous value may be used, i.e. the value of the record being updated, in order to implement field change events. Field or record change events may include increased, increased above x, etc. For scheduled events this may not be possible as only the current value will be available. These database events may be brought to a level that users can relate to by allowing rules to be setup from a context on a familiar form. For example; when right-clicking a field on a form, user defined events may extract context, including current field/table, joined in tables, active filter and parent, when possible.

In FIG. 6, the leftmost column, Rule Creation Time of the diagram may contain modules used to create rules; such as the Rule Creator User Interface 604, Rule Creator 606 and the Database log 608 which will be described further below. The Event time detection 610 and Event processing time 612 columns may contain modules used to record that change/update/delete events happen, and to process change, read, update and delete CRUD and date driven events which will be described further below. The rightmost column, alert viewing time 614, may contain modules used to view and drill-down into alerts which also may be described below (The Alert Inbox and Drill-Down section). The rows may describe the different layers of the system that are involved in the process starting at the user interface layer 616, then the business logic layer 618, then the kernel layer 620 and finally the data layer 622 where the database tables are located.

In general, the flow may start at the rule creator user interface 604 at the user interface layer 616. The user may select a field or record to monitor. In the business logic layer 618, the rule creator 606 may interpret the user's selection into the underlying database fields that may affect the selected field or record. The rule creator 606 may save the resulting rules in a rules table 624 in the database layer 622. The rule creator 606 may also communicate with the database log 608 to set triggers on the relevant database fields. The database log 608 may communicate with a class in the kernel 626 and which may operate in the kernel layer 620. The class in the kernel 626 may communicate with the CRUD event monitor 628 which may operate in the business logic layer 618. The CRUD event monitor may keep track of CRUD events which may be stored in event tables 630. Update events may affect fields and create, read or delete events may affect records.

The rule creator 606 may also communicate with the rule tables 624 which may operate in the database layer 622. The rules tables 624 may store all the created rules in a table. The rule table 624 may communicate with a due date batch job block 632 which may operate in the business logic layer 618. The due date batch job block 632 may periodically apply the rules that are date driven, such as whether an invoice has not been paid in 120 days, for example. The results of the due date batch job block 632 may be communicated and stored in the event table 630. In another embodiment, the due date batch job block 632 may communicate with the alert tables 636.

Both the event table 630 and the rule table 624 may communicate to the event processing batch job block 634 which may operate in the business logic layer 618. The event tables 630 and the rule table 624 may communicate with the event processing batch job such that the event processing batch job block 634 when events occur in the business logic layer 618, alerts will be generated. When the events processing batch job 634 may communicate with an alert table 636 which may be in the database layer 622. The alert tables 636 may keep track of events that have been triggered. The alert tables 636 may be in communication with the alert viewer 638 which may be in the business logic layer 618. Software application information 640 from the kernel layer 620 may also be communicated to the alert viewer 638. An alert user interface 642 may be in the user interface layer 616 and the alert user interface 642 may communicate to the alert viewer 638.

Creating Rules

Figure 7:
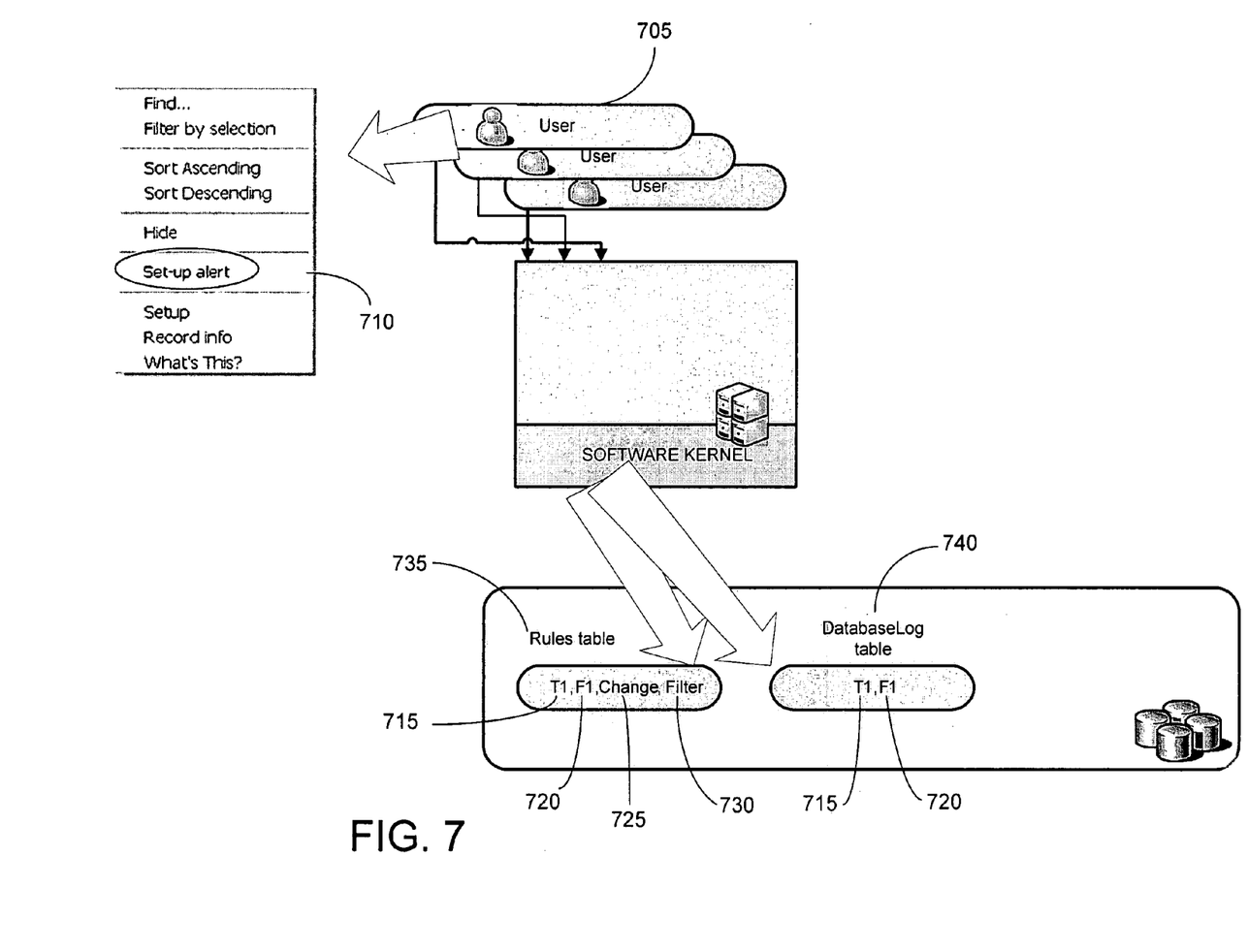
FIG. 7 is an illustration of a display to create rules on business data currently on-screen.

FIG. 7 may illustrate that ability to create rules on business data currently on-screen, meaning database fields exposed on forms. In this example there may be a number of servers that run a number of clients. A client 705 indicates an interest in changes to a field or record on the Purchase Order form by right-clicking on the field and selecting Set-Up Alert 710. The application software such as a CRM system will detect from the context, the table (T1) 715, the field (F1) 720, the change (if any) 725 and any currently defined filter 730. Clients may have the option to change what has been deduced from the context or to leave it as is. This information is saved in the rules table 735 and in addition to this the kernel table, a database log 740 is updated with table 715 and field 720 information as well.

A day-to-day user may only be allowed to create rules for her self; it is not possible for her to create rules on behalf of others. However, administrators may be able to manage other user's rules. In addition to this, day-to-day users may use the built-in functionality to create a template based on a rule; other users may be able use such a template to create additional rules.

Recording and Processing Events

Change, read, update and delete ("CRUD") events may be recorded by subscribing to the software kernel's database log functionality; information passed from the kernel when a CRUD event occurs. The CRUD event may be saved in the events table as part of the currently running transaction. This database table may be processed by the event processing batch job which may run each rule on matching events. To see if a rule matches an event, the event processing batch job may compare source (table, field) and field change specification for rules and events. Before a rule may be run it is checked if the associated user has access to the changed data; if not, the rule will not be run. A rule may be run by executing a filter setup for the rule and an action will be communicated or fired if the result of the query matches the record of the event. Note that before running the query it may have user access criteria for the associated user merged in, so that a user may only get alerted on data accessible to a user. The action available to end users may be to save alert information to the alert inbox table.

Recording and Processing CRUD Events

Figure 8:
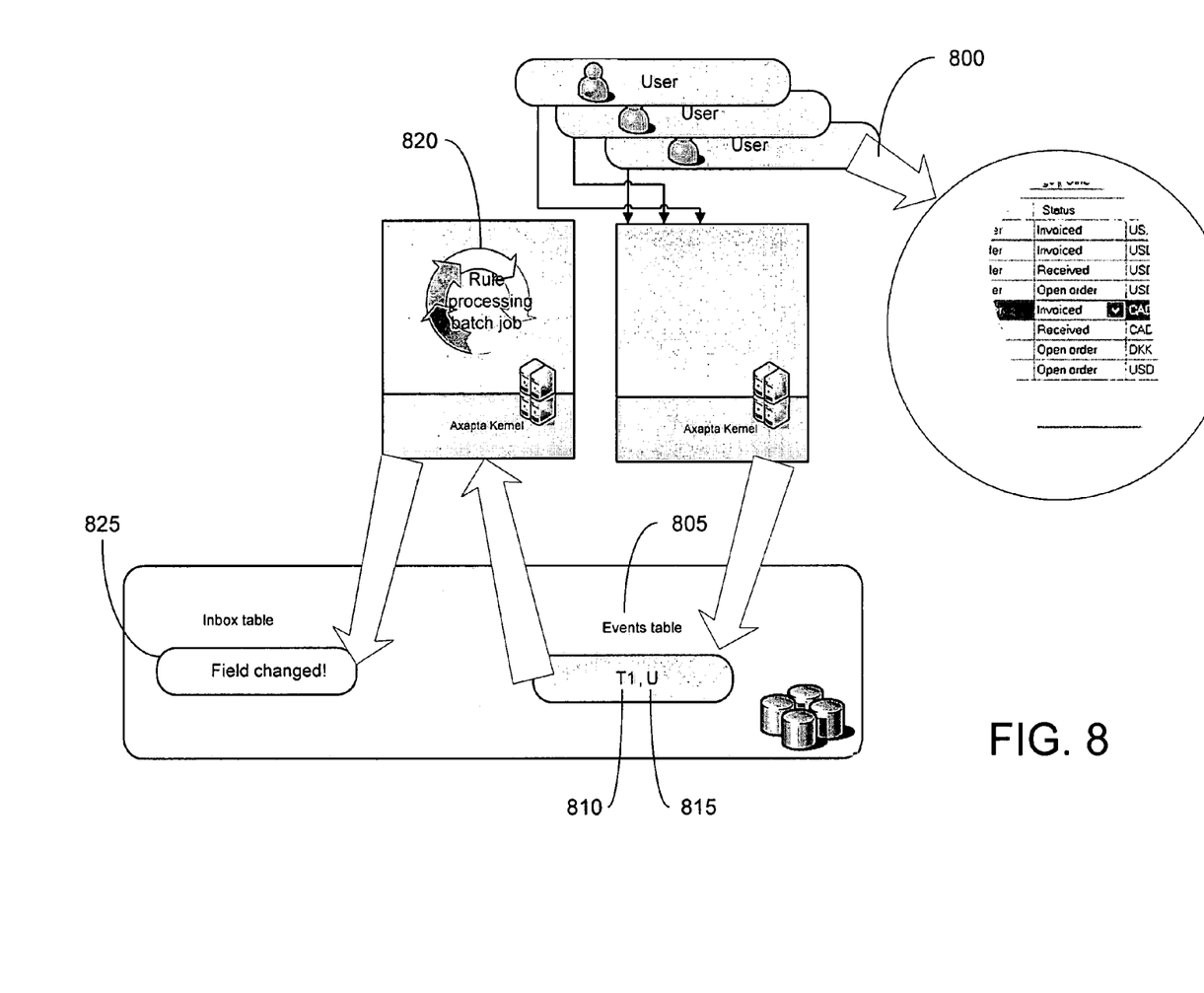
FIG. 8 is an illustration of a display of how change/read/update/delete events may be recorded.

FIG. 8 may be an illustration of a display of how change/update/delete events may be recorded. In this example, a client may have changed data in a field in a Purchase Order form 800. The method may record to the events table 805 that a record in table T1 810 has been updated 815. A short while later, the event processing batch job 820 may kick in or begin to consume all events recorded to the events table. If it turns out that the event matches the rule set up earlier (a record in the table T1 was updated and the field F1 changed its value—and the filter matched as well), the alert inbox table of that client may be updated 825.

Figure 9:
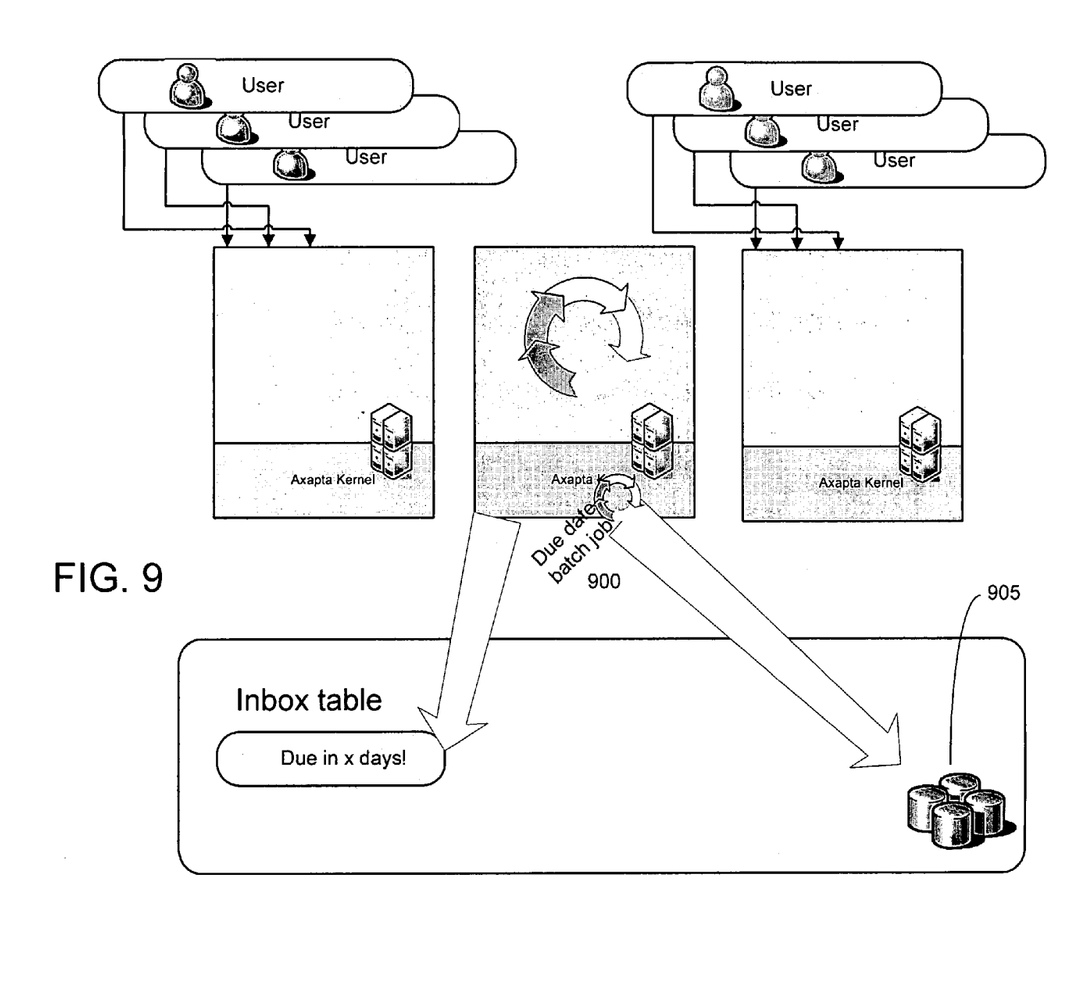
FIG. 9 is an illustration of a display of how date driven events will be recorded by running a daily due date batch job.

FIG. 9 may illustrate how date driven events will be recorded by running a daily due date batch job which will run each rule based on a date driven event. The process of matching a date driven event to a rule may be the same as that of matching a CRUD event to a rule, specifically, if it turns out that the event matches the rule set up earlier (a record in the table T1 was updated and the field F1 changed its value—and the filter matched as well), the alert inbox table of that client may be updated.

Recording and Processing of Date Driven Events

For date driven events, it may be that no client interaction initiates that events are created. The batch job may be run daily or on any desired frequency. The batch job 900 may check all scheduled queries by looking at current values in the database 905 and comparing to today's date. Any match may result in a record being inserted into the alert inbox table of that client may be updated.

The Alert Inbox and Drill-Down

When new alerts arrive into the alerts inbox, the user may be able to get a pop-up or attention grabber in the software application as well as a visual clue. For CRU (A CRU event is a CRUD event minus deletion; for deletions it makes no sense to drill-down as the business data in question has been deleted.) event based alerts, the method may allow a user to go from an alert in the alert inbox into a form that shows the current state of the business data in question. This may be referred to as drill-down. When possible, drill-down may go to the form on which the rule has been set up; and when this is not possible, drill-down may go to the default form for the master table of the rule. When neither forms are possible, the user may get an error message that drill-down is not possible.

Figure 10:
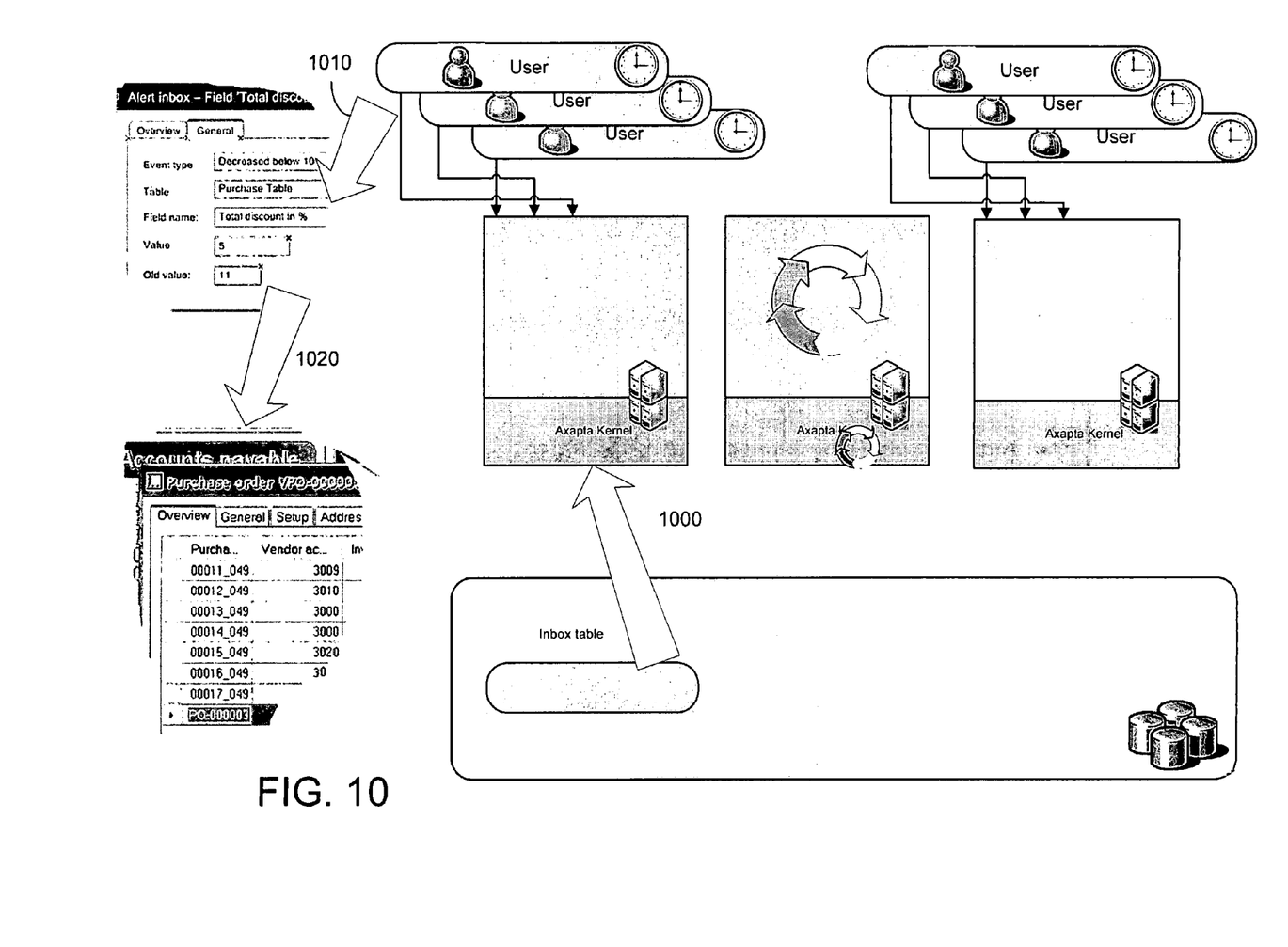
FIG. 10 may illustrate a display of drilling down for additional detail regarding an alert.

FIG. 10 may illustrate a process of drilling down. Each client process may monitor its alert inbox table in order to discover newly arrived alert information records 1000. When a new record is discovered, a pop-up may be shown and the alert information may be available in each client's inbox form 1010. From the inbox, it may be possible to drill-down to a form 1020. Note that the alert inbox is personal but it may contain alerts for a given user for all companies used by the user.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A method comprising:
displaying, by a computer of an end user, data from a database via a user interface that exposes database fields on forms;
receiving a selection from the end user of a selected field in a current form displayed on the user interface, the selected field having a current value affected by a plurality of underlying database fields joined from a plurality of tables in the database;
displaying, within the user interface, a menu including an option to create an alert rule in response to the selection of the selected field;
displaying, within the user interface, a form to create an alert rule for the selected field in response to selection of the option to create an alert rule by the end user, the form to create an alert rule for the selected field allowing the end user to set end user defined conditions for triggering an alert if the current value of the selected field changes to meet certain end user defined criteria, the end user defined conditions comprising:
the current value in the selected field changing to a value that exceeds an end user defined maximum value,
the current value in the selected field changing to a value that is below an end user defined minimum value, and
the current value in the selected field changing to a value that matches an end user defined exact value;
displaying, within the form to create an alert rule for the selected field, an option to trigger additional alerts if the selected field is modified in one or more other forms and meets end user defined criteria of an end user defined condition set for the selected field in the current form;

displaying, within the form to create an alert rule for the selected field, an option to select how often an alert is sent;

displaying, within the form to create an alert rule for the selected field, an option to select a notification format of an alert;

receiving, via the form to create an alert rule for the selected field, user input from the end user for generating an alert rule for the selected field, wherein the alert rule for the selected field results in monitoring of data changes in each of the plurality of underlying database fields joined from the plurality of tables in the database;

displaying, by the computer of the end user, an alert received in response to data in one or more of the plurality of underlying database fields being modified and the current value of the selected field changing to a new value that meets end user defined criteria of an end user defined condition set for the selected field in the alert rule for the selected field; and displaying, within the alert, an option to go to a form that shows the new value of the selected field that meets the end user defined criteria of the end user defined condition set for the selected field in the alert rule for the selected field.

2. The method of claim 1, further comprising:

displaying, on the computer of the end user, the form that shows the new value of the selected field in response to selection by the end user of the option to go to the form displayed within the alert.

3. The method of claim 1, further comprising:

displaying, on the computer of the end user, a previously created alert rule for use as a template to create a new alert rule.

4. A computing system comprising:

a processor configured to execute computer-executable instructions; and memory storing computer-executable instructions for:

displaying, to an end user, data from a database via a user interface that exposes database fields on forms;

receiving a selection of a selected field in a form displayed on the user interface, the selected field having a current value affected by a plurality of underlying database fields joined from a plurality of tables in the database;

displaying, within the user interface, a menu including an option to create an alert rule in response to the selection of the selected field;

displaying, within the user interface, a form to create an alert rule for the selected field in response to selection of the option to create an alert rule by the end user, the form to create an alert rule for the selected field allowing the end user to set end user defined conditions for triggering an alert if the current value of the selected field changes to meet certain end user defined criteria, the end user defined conditions comprising:

the current value in the selected field changing to a value that exceeds an end user defined maximum value, the current value in the selected field changing to a value that is below an end user defined minimum value, and the current value in the selected field changing to a value that matches an end user defined exact value;

displaying, within the form to create an alert rule for the selected field, an option to trigger additional alerts if the selected field is modified in one or more other forms and meets end user defined criteria of an end user defined condition set for the selected field in the current form;

displaying, within the form to create an alert rule for the selected field, an option to select how often an alert is sent;

displaying, within the form to create an alert rule for the selected field, an option to select a notification format of an alert;

receiving, via the form to create an alert rule for the selected field, user input from the end user for generating an alert rule for the selected field, wherein the alert rule for the selected field results in monitoring of data changes in each of the plurality of underlying database fields joined from the plurality of tables in the database;

displaying, to the end user, an alert received in response to data in one or more of the plurality of underlying database fields being modified and the current value of the selected field changing to a new value that meets end user defined criteria of an end user defined condition set for the selected field in the alert rule for the selected field; and displaying, within the alert, an option to go to a form that shows the new value of the selected field that meets the end user defined criteria of the end user defined condition set for the selected field in the alert rule for the selected field.

5. The computing system of claim 4, wherein the memory further stores computer-executable instructions for:

displaying, to the end user, the form that shows the new value of the selected field in response to selection by the end user of the option to go to the form displayed within the alert.

6. The computing system of claim 4, wherein the memory further stores computer-executable instructions for:

displaying, to the end user, a previously created alert rule for use as a template to create a new alert rule.

7. A computer-readable storage device storing computer-executable instructions that, when executed by a computer, cause the computer to perform a method comprising:

displaying, to an end user, data from a database via a user interface that exposes database fields on forms;

receiving a selection of a selected field in a form displayed on the user interface, the selected field having a current value affected by a plurality of underlying database fields joined from a plurality of tables in the database;

displaying, within the user interface, a menu including an option to create an alert rule in response to the selection of the selected field;

displaying, within the user interface, a form to create an alert rule for the selected field in response to selection of the option to create an alert rule by the end user, the form to create an alert rule for the selected field allowing the end user to set end user defined conditions for triggering an alert if the current value of the selected field changes to meet certain end user defined criteria, the end user defined conditions comprising:

the current value in the selected field changing to a value that exceeds an end user defined maximum value, the current value in the selected field changing to a value that is below an end user defined minimum value, and the current value in the selected field changing to a value that matches an end user defined exact value;

displaying, within the form to create an alert rule for the selected field, an option to trigger additional alerts if the selected field is modified in one or more other forms and meets end user defined criteria of an end user defined condition set for the selected field in the current form;

displaying, within the form to create an alert rule for the selected field, an option to select how often an alert is sent;

displaying, within the form to create an alert rule for the selected field, an option to select a notification format of an alert;

receiving, via the form to create an alert rule for the selected field, user input from the end user for generating an alert rule for the selected field, wherein the alert rule for the selected field results in monitoring of data changes in each of the plurality of underlying database fields joined from the plurality of tables in the database;

displaying, to the end user, an alert received in response to data in one or more of the plurality of underlying database fields being modified and the current value of the selected field changing to a new value that meets end user defined criteria of an end user defined condition set for the selected field in the alert rule for the selected field; and displaying, within the alert, an option to go to a form that shows the new value of the selected field that meets the end user defined criteria of the end user defined condition set for the selected field in the alert rule for the selected field.

8. The computer-readable storage device of claim 7, further storing computer-executable instructions for:

displaying, to the end user, the form that shows the new value of the selected field in response to selection by the end user of the option to go to the form displayed within the alert.

9. The method of claim 1, further comprising:

creating an alert rule having a plurality of end user defined conditions, wherein each of the plurality of end user defined conditions includes end user defined criteria that must be met before an alert is received.

10. The computing system of claim 4, wherein the memory further stores computer-executable instructions for:

creating an alert rule having a plurality of end user defined conditions, wherein each of the plurality of end user defined conditions includes end user defined criteria that must be met before an alert is received.

11. The computer-readable storage device of claim 7, further storing computer-executable instructions for:

creating an alert rule having a plurality of end user defined conditions, wherein each of the plurality of end user defined conditions includes end user defined criteria that must be met before an alert is received.

12. The computer-readable storage device of claim 7, further storing computer-executable instructions for:

displaying, to the end user, a previously created alert rule for use as a template to create a new alert rule.

13. The computer-readable storage device of claim 7, further storing computer-executable instructions for:

a rule creator module configured to save alert rules in a rules table and communicate with a database log to set triggers on the underlying database fields.

14. The computer-readable storage device of claim 7, further storing computer-executable instructions for:

an event processing module configured to match alert rules with change-based events.

15. The computer-readable storage device of claim 7, further storing computer-executable instructions for:

displaying, to the end user, a user interface for reviewing and managing alert rules created by the end user.

16. The method of claim 1, further comprising:

displaying, by the computer of the end user, a user interface for reviewing and managing alert rules created by the end user.

17. The computing system of claim 4, wherein the memory further stores computer-executable instructions for:

displaying, to the end user, a user interface for reviewing and managing alert rules created by the end user.

18. The method of claim 1, wherein the selection of the selected field comprises a right click operation.

19. The computing system of claim 4, wherein the selection of the selected field comprises a right click operation.

20. The computer-readable storage device of claim 7, wherein the selection of the selected field comprises a right click operation.

* * * * *